March 14, 1967     H. W. SEELER     3,308,817
REDUCTION REGULATOR VALVE FOR SCUBA SYSTEM
Filed April 24, 1964     2 Sheets-Sheet 1

INVENTOR
HENRY W. SEELER

BY *Claude Funkhouser*
ATTORNEY

United States Patent Office 3,308,817
Patented Mar. 14, 1967

3,308,817
REDUCTION REGULATOR VALVE FOR
SCUBA SYSTEM
Henry W. Seeler, 3142 Atherton Road,
Dayton, Ohio 45409
Filed Apr. 24, 1964, Ser. No. 362,537
10 Claims. (Cl. 128—147)

This invention described herein may be manufactured and used by or for the Government of the United States of America for governmental purposes without the payment of any royalties thereon or therefor.

This invention relates to the combined deep sea depth-controlled air or helium plus oxygen mixture dual control valve which is adapted to be used with that type of diving apparatus commonly termed scuba.

Heretofore, valves of this type have been of the semi-automatic type where the control of the mixture is generally hand adjusted and the control of the amount of the mixed gas regulated automatically by the depth of water at which the diver is working. This required constant attention on the part of the diver and often resulted in a not too accurately controlled mixture. A valve which would change automatically with increasing depth from compressed air breathing to a predetermined mixture of helium and oxygen, according to the depth at which the diver happens to be at the moment, varying with each change in depth to automatically supply the mixture of helium and oxygen would relieve the diver of any manual operation to regulate the breathing apparatus. A valve of this type would provide air at shallow diving depth and would as the diving depth increases, admit an ever increasing percentage of helium-oxygen mixture until a predetermined depth is reached, after which only gas from the helium-oxygen supply is passed to the diver.

It is an object of the present invention to provide a regulator valve for an open circuit demand scuba system which will automatically provide air for breathing at shallow depths and upon the descent of the diver will shift to a mixture of helium and oxygen.

It is another object of the present invention to provide a regulator valve for a demand type system which will provide air for breathing while a diver is in shallow water and will shift to a mixture of helium and oxygen upon the descent of the diver to deeper water, the change being accomplished by the pressure exerted by the water.

It is a further object of the present invention to provide a regulator valve for a demand type system which has inlet openings for air and a mixture of helium and oxygen and a single outlet port for either the air or the mixture of helium and oxygen or a mixture of both and to provide easy access to the working parts of the valve for either cleaning or repair.

It is a still further object of the present invention to provide a regulator valve for a demand type system which has a source of nitrogen, a source of oxygen and to so regulate the supply of the gases from these sources that the diver will get first a mixture of nitrogen and oxygen; secondly, the diver will be supplied with oxygen plus a mixture of nitrogen and helium; this will change to a mixture of helium and oxygen with increasing depth and finally the oxygen will be reduced in volume as the depth increases.

It is a still further object of the present invention to provide a regulator valve for regulating the supply of a plurality of gases to a diver, automatically determined by the depth of water and the demand, that is the amount of gas inhaled by the diver at any particular breath which may be varied by the work and exertion the diver is exposed to, and to make this valve of simple construction which can be taken apart for cleaning or adjusting or replacement of parts.

It is still another object of the present invention to provide a valve for regulating the kind and amount of gas delivered to a diver for breathing which may be easily checked as to pressure requirements and may be thoroughly tested before diving and under conditions simulating those under which the diver will work.

Other objects, advantages and novel features of the invention will become apparent from the following detailed description of the invention when considered in conjunction with the accompanying drawings wherein.

Figure 1:
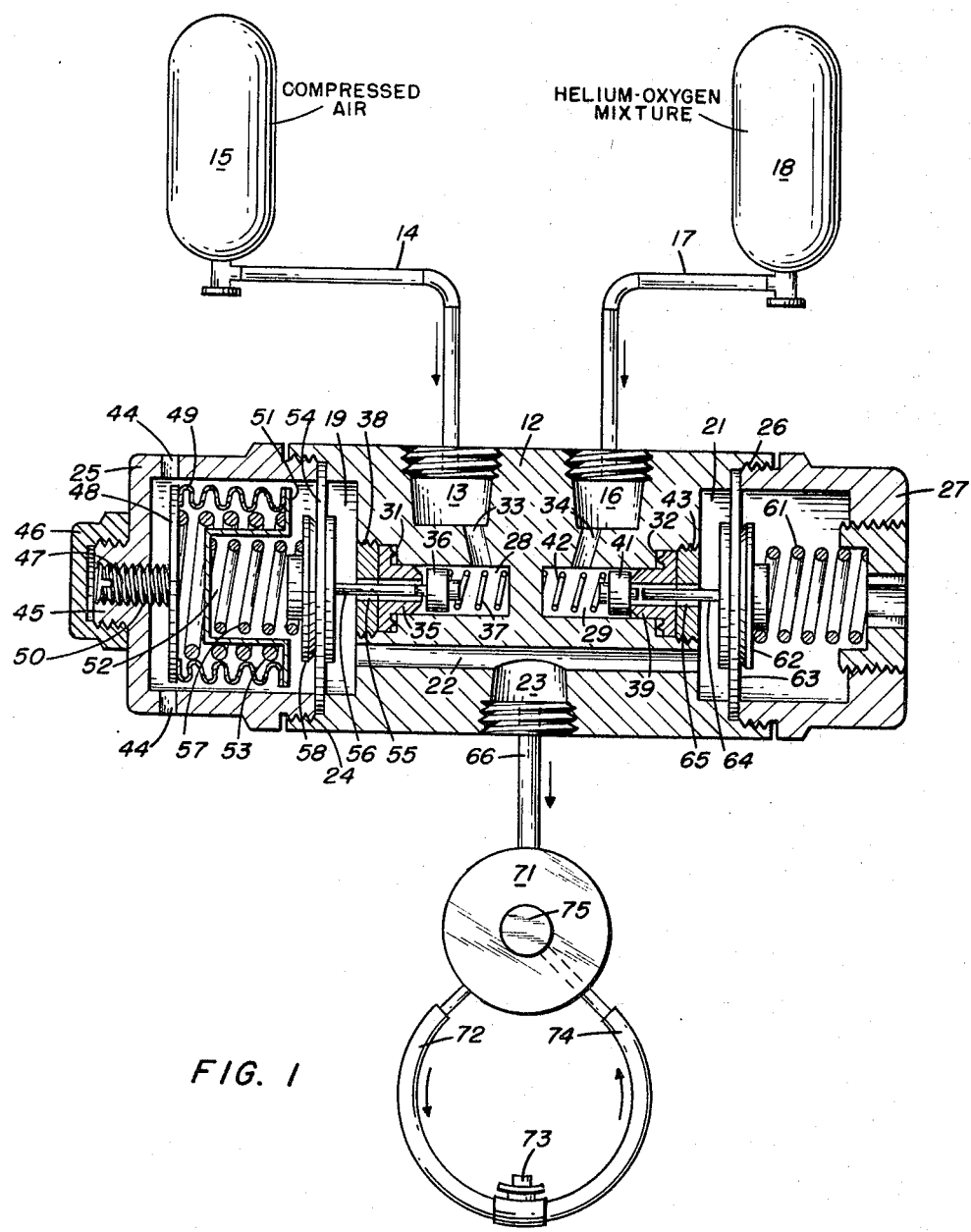
FIG. 1 is a longitudinal section showing conventional parts diagrammatically.

Referring to FIG. 1, the valve comprises a central, substantially cylindrical housing 12 formed with an inlet port 13 connected by a tube 14 to a source of compressed air 15. It is likewise formed with an inlet port 16 connected by a tube 17 to a source of a mixture of helium and oxygen 18. It is further formed with cylindrical recesses 19 and 21 at each of its ends, respectively. A longitudinal bore 22 connects recess 19 with recess 21 and a discharge port 23 is connected to the longitudinal bore 22.

The recess 19 is internally threaded at 24 to receive the hollow cap plug 25, while in like manner the recess 21 is internally threaded at 26 to receive the hollow cap plug 27. The housing 12 is further formed with centrally located, substantially cylindrical, compartments 28 and 29 which are enlarged at 31 and 32, respectively, and connect with the end recesses 19 and 21, respectively. A passageway 33 connects the inlet port 13 with the central compartment 28 and in like manner a passageway 34 connects the inlet port 16 with the central compartment 29.

Seated in the enlarged portion 31 of the central compartment 28, a valve seat 35 receives the air admission valve 36 biased to a seated position by the spring 37. The valve seat 35 is securely held in place by the threaded washer 38. With similar construction a valve seat 39 receives the valve 41 (controlling the admission of the mixture of helium and oxygen) biased by the valve spring 42 and the valve seat in turn is secured in position by the threaded washer 43.

The end cap 25 is formed with ports 44 admitting sea water to the interior of the cap. It is further formed with a central hub 45 which may be covered with a cap 46. The hub is centrally bored and threaded at 50 to receive an adjusting screw 47. An extensible bellows 49 is housed in the end cap 25 and has an end plate 48 which bears against the screw 47. Turning of the screw 47 changes the position of the plate 48 relative to the end cap 25. The bellows 49 terminates in another plate 51 formed with a central annular depression 52. Housed within the bellows 49 is a coil bellows spring 53 which bears against the end plates 48 and 51 and tends to extend the bellows.

The end cap 25 is threaded onto the housing 12 and securely holds a diaphragm 54 in sealing position across the end recess 19 providing a chamber at the bottom of the recess 19 adjacent the threaded washer 38 and in communication with a passageway 55 passing through the threaded washer and the valve seat 35 to be closed by the valve 36 under pressure of the spring 37. The diaphragm has an attached rod 56 extending through the passageway 55 to contact the valve 36.

Seated in the central depression 52 of the end plate 51 is an air pressure adjustment coil spring 57 which presses against the diaphragm 54 through a spring seat 58. The pressure exerted on the diaphragm is determined by the strength of the air adjustment spring 57 and the pressure exerted by the bellows spring 53 on the end plate 51.

The pressure exerted by the spring 49 is controlled by the screw 47. In the installation of the bellows this screw 47 is adjusted so that the diaphragm has a pressure of 75 lbs./in.² acting to open the valve 36. The pressure of the air in tank 15 may be anywhere from 1800 to 3000 lbs./in.² and will fill chamber 19 to exert more than 75 lbs./in.² on the diaphragm. This permits the spring 37 to close the valve which will be opened again when the pressure in chamber 19 drops below 75 lbs./in.².

The other end of the housing is closed by the end cap 27 formed with a central annular depression in which is seated a coil spring 61. A central opening in the annular depression admits sea water into the interior of the end cap 27. The coil spring 61 bears against the seat 62 of the diaphragm 63 which is thus subject to the pressure of the coil spring 61 and the pressure exerted by the depth of water at which the apparatus is being used. The diaphragm 63 seals the opening of the housing and provides a small chamber at the bottom of the recess 21 between the diaphragm 63 and the threaded washer 43. Attached to the diaphragm is a slender rod 64 which extends through a passageway 65 in the threaded washer 43 and the valve seat 39 to contact the valve 41 which is urged into seated position by the spring 42.

Connected to the outlet 23 is a tube 66 connected to a conventional open circuit scuba demand regulator or any type of mouthpiece apparatus. The demand regulator comprises a housing 71 to which the tube 66 is attached. Also, to this housing an inhaling tube 72 is affixed. The tube 72 leads to a mouthpiece 73 of conventional construction having inhalation and exhalation valves, not shown. An exhaling tube 74 is also attached to the mouthpiece and leads to an exhalation port 75 in the housing 71.

The operation of the valve of FIG. 1 may be briefly described as follows.

Assuming that the diver has the apparatus in proper position and has descended into shallow water with a pressure of 1800 lbs./in.² in the tank 15 containing the compressed air and that the air adjustment coil spring is set for an air pressure of 75 pounds, the air will enter the chamber 19 through the valve passageway 55 and pass through the passage 22 to the outlet passageway 23. The air under pressure will continue through the passage 22 into the chamber at the bottom of the recess 21 and exert a force against the diaphragm 63 urging the diaphragm against the coil spring 61 which has a calibrated force of 50 pounds. This pressure of 75 pounds exerted against the diaphragm 63 insures that the rod 64 will be free of contact with the valve 41, which will be held in seated position by the valve spring 42 preventing any admission of the mixture of helium and oxygen. The air going through the outlet 23 travels through the tube 66 and tube 72 reaching the mouthpiece 73 in the ordinary manner. This is the procedure when the diver is working in shallow water where he will be breathing air only.

When the diver descends into deeper water, the pressure exerted by the water within the end cap 25 on the bellows 49 will contract the bellows, which in turn will permit the coil spring 57 to extend thereby lessening the pressure on the diaphragm 54, permitting the valve 36 to close under the action of the valve spring 37. The reduction of the pressure exerted on the diaphragm 54 and the closing of the valve 36 reduces the pressure exerted on the housing side of the diaphragm 63 permitting the spring 61 to press against the diaphragm 63 and urge the rod 64 against the valve 41, opening the passageway 65 to the tank containing a mixture of helium and oxygen to admit oxygen and helium to the outlet port 23 and to the mouthpiece 73. At the time the diver is working at a depth where the valve 36 is being opened and closed due to changes in water pressure, there will be a mixture of air and the helium-oxygen mixture which will change entirely to the helium-oxygen mixture as the diver descends.

Figure 2:
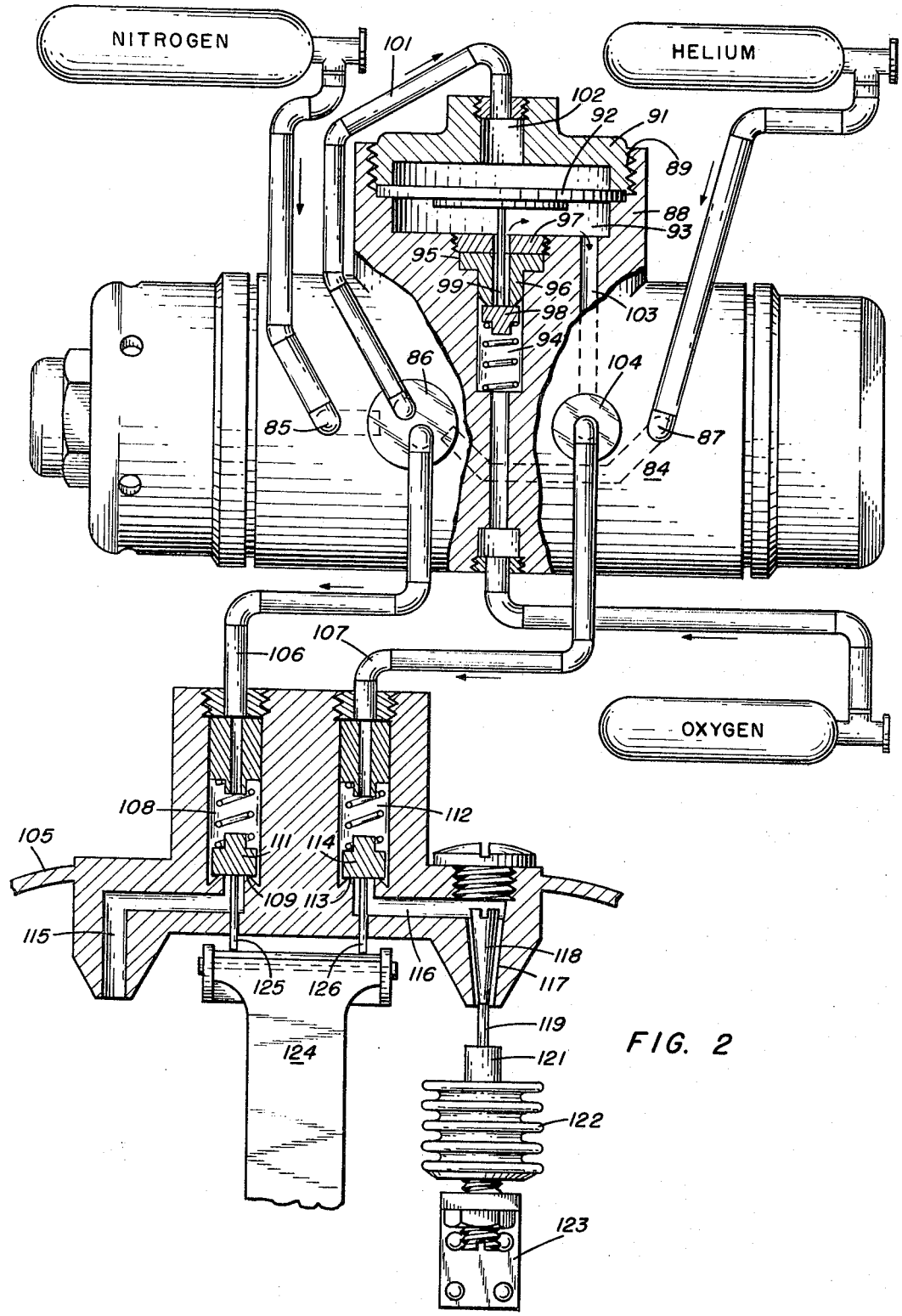
FIG. 2 is a side elevation of a modification showing conventional parts diagrammatically and showing parts in section.

Referring to FIG. 2, a similar valve is shown involving the use of nitrogen and helium with oxygen. This valve is the same structure as the valve of FIG. 1 so far as the nitrogen and helium are concerned; the nitrogen taking the place of the compressed air and the helium taking the place of the helium-oxygen mixture. To this a tank of oxygen is added and the outlet pressure of either of the two gases, nitrogen or helium, is utilized to control the admission of the oxygen from the tank. The two gases, either nitrogen or helium, and oxygen are conducted to the conventional demand regulator housing, where the gases are proportional for delivery, the oxygen being about one-fourth of the volume of either of the others. An additional control adjusted by the pressure of the water serves to further meter the amount of oxygen delivered so that as the depth increases the amount of oxygen is decreased.

The regulating valve shown in FIG. 2 comprises a housing 84 formed with nitrogen inlet port 85, and outlet port 86, while the helium is delivered to an inlet port 87 and is released through the same outlet port 86. The internal structure for the shut-off of the nitrogen and the admission of the helium is the same as that described for the structure of FIG. 1.

Adding to the structure of FIG. 1, the housing is formed slightly different, having an extension 88 formed with an internally threaded recess 89 receiving end cap 91 seated on diaphragm 92, sealing the recess and providing chamber 93. Inwardly of the recess 89 a cylindrical chamber 94 enlarged at 95 to receive valve seat 96 and threaded washer 97 houses a spring biased valve 98. A slender rod 99 attached to the diaphragm 92 opens the valve 98 to admit oxygen to the chamber 93. The diaphragm 92 is actuated by the pressure at the outlet port 86, through the tube 101, a central opening 102 in the end cap 91 to the outer side of the diaphragm 92. While pressure exists at the outlet port 86, oxygen will be admitted to the chamber 93 but should there be no pressure at the outlet port by reason of empty tanks of nitrogen or helium, the admission of oxygen will be shut-off preventing the diver from getting an atmosphere of pure oxygen. The oxygen passes from the chamber 93 through passageway 103 to the oxygen outlet port 104.

Attached to the conventional housing 105 of the regular diving apparatus is a dual demand valve having a nitrogen and/or helium inlet tube 106 and an oxygen inlet tube 107. The nitrogen and/or helium inlet tube 106 is connected to an inlet chamber 108 formed with a valve seat 109 on which a spring biased valve 111 seats. The valve 111 is controlled through a lever system actuated by the respiration of the diver. The oxygen inlet tube 107 is connected to an inlet chamber 112 formed with a valve seat 113 on which is seated a spring biased valve 114. The chamber 108 connects with passageway 115 and the chamber 112 connects with the passageway 116, both passages leading to the inhaling side of a mouthpiece of conventional design. The passageway 116 is formed with a conical shaped outlet 117 into which a tapered pin 118 extends. The tapered pin 118 is carried on the end of rod 119 connected to one end 121 of a bellows 122. The bellows 122 is supported at the other end by bracket 123 and is exposed to the pressure of the water at the depth at which the apparatus is being used. As the pressure on the bellows increases, the rod 119 moves the tapered pin 118 downward to increasingly restrict the conical shaped outlet to effectively reduce the amount of oxygen delivered to the mouthpiece. The reduction of the oxygen at the conical outlet changes the proportion of the nitrogen and/or helium and oxygen delivered to the mouthpiece, reducing the oxygen as the depth increases.

A lever 124 of conventional construction is actuated by the inhalation of the diver to move rods 125 and 126 to respectively open the valves 111 and 114. The construction of this demand system is not shown as any of the conventional types now in use may be used.

The operation of the valve shown in FIG. 2 may be briefly described as follows.

The operation of the valve with relation to the delivery of either nitrogen or helium is the same as the valve of FIG. 1, the nitrogen being shut-off at a predetermined depth and the helium allowed to flow. With the delivery of either nitrogen or helium to the outlet 86, the pressure of 75 pounds, for example, at this point is transferred to the diaphragm 92 which moves the rod 99 to open the valve 98 to admit oxygen to the chamber 93 and then to the inlet chamber 112. There will be a slight pressure drop due to opening the valve 96 so that the pressure of the oxygen is slightly less than that of the helium or nitrogen as the case may be. The demand lever 124 will open both valves 111 and 114 and a mixture of helium or nitrogen and oxygen will be delivered. The outlets 115 and 116 differ in that the outlet 116 has a conical nozzle 117 which is restricted so that oxygen is delivered at the ratio of 1:4 with helium. This ratio is automatically varied by the reciprocation of the tapered pin 118 under the contraction of the bellows 122 to further restrict the opening 117. Thus, a mixture of either nitrogen (in shallow water) or helium (in deep water) and oxygen in the ration of 4:1 is delivered on demand and the oxygen content of the mixture is lessened as the diver goes deeper to make the ratio as great as 10s1.

The above description of operation is for descending divers. It is obvious that the apparatus will function in reverse. When the diver is returning to the surface, the valves will function to change the gases furnished to the diver for breathing in a reverse manner, gradually increasing the oxygen, then adulterate the helium-oxygen mixture with air or nitrogen and finally shut-off the helium-oxygen mixture to give the diver only air or a nitrogen-oxygen mixture.

Obviously many modifications and variations of the present invention are possible in the light of the above teachings. It is therefore to be understood that within the scope of the appended claims the invention may be practiced otherwise as specifically described.

What is claimed is:

1. In an open circuit scuba diving demand breathing system for divers, said system having a tank of compressed air and a tank of a mixture of helium and oxygen and having a mouthpiece forced with respiratory valves, a regulator valve comprising:
   a cylindrical housing having inlets connected to the separate tanks of air and the helium-oxygen mixture and an outlet connected to the mouthpiece, said housing being formed with two internally threaded ends;
   means controlling the admission of air to said housing, said means being located within the housing adjacent one of the threaded ends to provide for removal;
   means actuated by the pressure of the admitted air controlling the admission of helium-oxygen mixture to said housing, said means being located within the housing adjacent the other end of the housing to provide for removal;
   means actuated by change of water pressure controlling the air admission means to decrease the air admission upon increase in static water pressure;
   whereby at increasing depth the static water pressure throttles the admission of air and increasingly admits the helium-oxygen mixture until at a predetermined depth the air is shut off and only the helium-oxygen is admitted.

2. In an open circuit scuba diving demand breathing system for divers, a regulator valve according to claim 1 and including:
   two removable screw caps fitting the internally threaded ends of the housing;
   the screw caps housing the means controlling the admission of air; and
   the means controlling the admission of a mixture of helium and oxygen, respectively.

3. In an open circuit scuba diving demand breathing system for divers, a regulator valve according to claim 1 wherein the means controlling the admission of air to the housing comprises:
   a valve located in the air inlet of the housing controlling the admission of air to the housing;
   a spring biasing said air admission valve to closed position;
   a spring balanced air diaphragm actuating said spring biased valve; and
   means actuated by water pressure controlling the tension of said balancing spring to relieve the spring force on the air-controlling diaphragm to actuate the spring biased air admission valve.

4. In an open circuit scuba diving demand breathing system for divers, a regulator valve according to claim 3 wherein the means actuated by water pressure comprises:
   a bellows externally exposed to water pressure at which the apparatus is being used;
   a coil spring within said bellows;
   said coil spring serving as a support for the diaphragm balancing spring;
   whereby movement of the bellows coil spring, because of contraction of said bellows, causes expansion of said diaphragm balancing spring to flex said diaphragm and actuate said air admission valve.

5. In an open circuit scuba diving demand breathing system for divers, a regulator valve according to claim 3 wherein the means controlling the admission of the mixture of helium and oxygen comprises:
   a spring biased helium-oxygen valve in the inlet port of said housing;
   a spring balanced helium-oxygen controlling diaphragm adapted to actuate said spring biased valve; and
   means connecting the air inlet on the inlet side of the air-controlling diaphragm with the helium-oxygen controlling diaphragm, controlling the actuation of the spring biased valve admitting the mixture of helium and oxygen so that a pressure drop of the admitted air will actuate the spring biased helium-oxygen controlling valve.

6. In an open circuit scuba diving demand breathing system for divers, a regulator valve according to claim 5 wherein the means connecting the air inlet with the helium-oxygen controlling diaphragm controlling the actuation of the spring biased valve is a passageway built into the housing.

7. In an open circuit demand breathing system having a source of nitrogen, a source of helium and a source of oxygen and having a mouthpiece, a regulator valve comprising:
   a housing having an inlet port connected to the source of the nitrogen, an inlet port connected to the source of the helium and an inlet port connected to the source of the oxygen, an outlet port for either the nitrogen or the helium and an outlet port for the oxygen;
   means controlled by the pressure of the water for admitting either nitrogen or helium to the housing and through the housing to the outlet port;
   means connected with the helium outlet port controlling the admission of oxygen to the housing and to the oxygen outlet port; and
   means actuated by demand from the mouthpiece and connected to the helium and oxygen outlet ports for delivering the helium and oxygen to the mouthpiece.

8. In an open circuit demand breathing system, a regulator valve according to claim 7 and including:
means for regulating the amount of oxygen delivered to the mouthpiece;
said means being interposed between the oxygen outlet port of the housing and the mouthpiece.

9. In an open circuit demand breathing system for divers, a regulator valve according to claim 8 wherein the means regulating the amount of oxygen delivered to the mouthpiece comprises a conical shaped valve seat, a cone shaped member movable longitudinally on said seat to vary the amount of oxygen passing through the valve.

10. In an open circuit demand breathing system for divers, a regulator valve according to claim 9 and including means automatically actuated by water pressure to move said cone shaped member along said valve seat.

References Cited by the Examiner

UNITED STATES PATENTS

| 2,354,286 | 7/1944 | Whaley | 137—113 |
| 2,915,059 | 12/1959 | Le Masson | 128—142 |
| 3,068,864 | 12/1962 | Tietze | 128—142 |

FOREIGN PATENTS

| 680,053 | 8/1939 | Germany. |
| 690,930 | 5/1940 | Germany. |

RICHARD A. GAUDET, *Primary Examiner.*

ROBERT E. MORGAN, *Examiner.*

W. E. KAMM, *Assistant Examiner.*